(12) United States Patent
Thomason et al.

(10) Patent No.: US 11,200,268 B2
(45) Date of Patent: Dec. 14, 2021

(54) DETERMINING GAPS IN DATA

(71) Applicant: International Business Machines Corporation, Armonk, NY (US)

(72) Inventors: Lowell Thomason, Byron, MN (US); John Rud, Rochester, MN (US); Ken Trisko, Stewartville, MN (US); Neal Dobberke, Rochester, MN (US); Ronald S. Wesely, Rochester, MN (US); Terry Staarmann, Boulder, CO (US); Timothy H. Brandt, Elysian, MN (US); Daniel John Cutshall, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 257 days.

(21) Appl. No.: 15/971,585

(22) Filed: May 4, 2018

(65) Prior Publication Data

US 2019/0340295 A1 Nov. 7, 2019

(51) Int. Cl.
*G06F 16/335* (2019.01)
*G06Q 10/06* (2012.01)
*G06F 16/33* (2019.01)
*G06F 16/9535* (2019.01)

(52) U.S. Cl.
CPC ........ *G06F 16/337* (2019.01); *G06F 16/3334* (2019.01); *G06F 16/9535* (2019.01); *G06Q 10/063112* (2013.01)

(58) Field of Classification Search
CPC ............... G06F 16/337; G06F 16/3334; G06F 16/9535; G06Q 10/063112
See application file for complete search history.

(56) References Cited

U.S. PATENT DOCUMENTS

| | | |
|---|---|---|
| 7,457,764 B1 | 11/2008 | Bullock et al. |
| 2003/0182178 A1 | 9/2003 | D'Elena et al. |
| 2004/0219493 A1 | 11/2004 | Phillips |
| 2006/0271421 A1 | 11/2006 | Steneker et al. |
| 2009/0276231 A1 | 11/2009 | Bazigos et al. |
| 2011/0177483 A1 | 7/2011 | Needham et al. |
| 2012/0197733 A1* | 8/2012 | Skomoroch ........... G06F 16/355 705/14.66 |
| 2012/0197993 A1* | 8/2012 | Skomoroch ........ G06Q 30/0269 709/204 |

(Continued)

*Primary Examiner* — Apu M Mofiz
*Assistant Examiner* — Husam Turki Samara
(74) *Attorney, Agent, or Firm* — Cantor Colburn LLP; Tihon Poltavets

(57) ABSTRACT

Examples of techniques for performing a skill gap comparison between a first individual and a second individual (or group) are disclosed. In one example, a computer-implemented method includes receiving first data associated with the first individual and receiving second data associated with the second individual. The method further includes identifying preferences for performing the skill gap comparison and assigning a weight for each of a plurality of elements of the first data and the second data. The method further includes performing the skill gap comparison between the first individual and the second individual by comparing the first data to the second data. The method further includes generating a list of one or more skills for which there is a skill gap between the first individual and the second individual.

19 Claims, 6 Drawing Sheets

(56) References Cited

U.S. PATENT DOCUMENTS

| | | | |
|---|---|---|---|
| 2013/0262175 A1* | 10/2013 | Deshpande | G06Q 10/06 705/7.25 |
| 2014/0032435 A1* | 1/2014 | Desai | G06Q 50/01 705/321 |
| 2014/0324721 A1* | 10/2014 | Rennison | G06Q 50/2057 705/321 |
| 2015/0046356 A1* | 2/2015 | Millmore | G06Q 10/1053 705/321 |
| 2017/0154307 A1 | 6/2017 | Maurya et al. | |
| 2017/0154308 A1 | 6/2017 | Duerr et al. | |
| 2017/0213179 A1 | 7/2017 | Schissel et al. | |
| 2018/0096306 A1* | 4/2018 | Wang | G06Q 10/1053 |
| 2019/0108275 A1* | 4/2019 | Gulli | G06F 16/3322 |

* cited by examiner

DETERMINING GAPS IN DATA

BACKGROUND

The present invention generally relates to data processing system, and more specifically, to determining gaps in data.

Data are collected in a variety of ways from various sources. It may be desirable to analyze the data to extract meaningful information from the data. For example, in data analysis, it may be desirable to compare data sets to determine differences in the data. In one such example, data associated with a first individual can be compared to data associated with a second individual (or group) to determine differences or gaps or differences between the data.

SUMMARY

Embodiments of the present invention are directed to a computer-implemented method for performing a skill gap comparison between a first individual and a second individual. A non-limiting example of the computer-implemented method includes receiving, by a processing device, first data associated with the first individual. The method further includes receiving, by the processing device, second data associated with the second individual. The method further includes identifying, by the processing device, preferences for performing the skill gap comparison. The method further includes assigning, by the processing device, a weight for each of a plurality of elements of the first data and the second data. The method further includes performing, by the processing device, the skill gap comparison between the first individual and the second individual by comparing the first data to the second data based at least in part on the preferences identified for performing the skill gap comparison and the weight assigned for each of the plurality of elements of the first data and the second data. The method further includes generating, by the processing device, a list of one or more skills for which there is a skill gap between the first individual and the second individual.

Embodiments of the present invention are directed to a system. A non-limiting example of the system includes a memory comprising computer readable instructions and a processing device for executing the computer readable instructions for performing a method for performing a skill gap comparison between a first individual and a second individual.

Embodiments of the invention are directed to a computer program product. A non-limiting example of the computer program product includes a computer readable storage medium having program instructions embodied therewith. The program instructions are executable by a processor to cause the processor to perform a method for performing a skill gap comparison between a first individual and a second individual.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
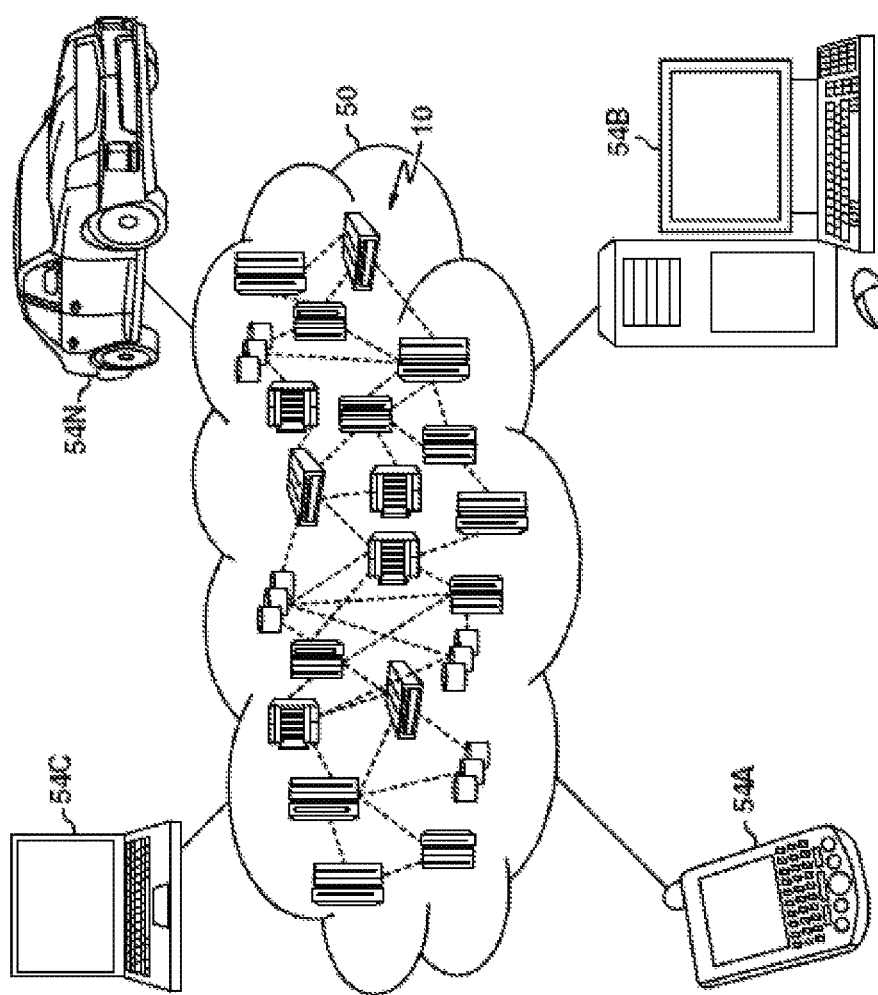
FIG. 1 depicts a cloud computing environment according to aspects of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
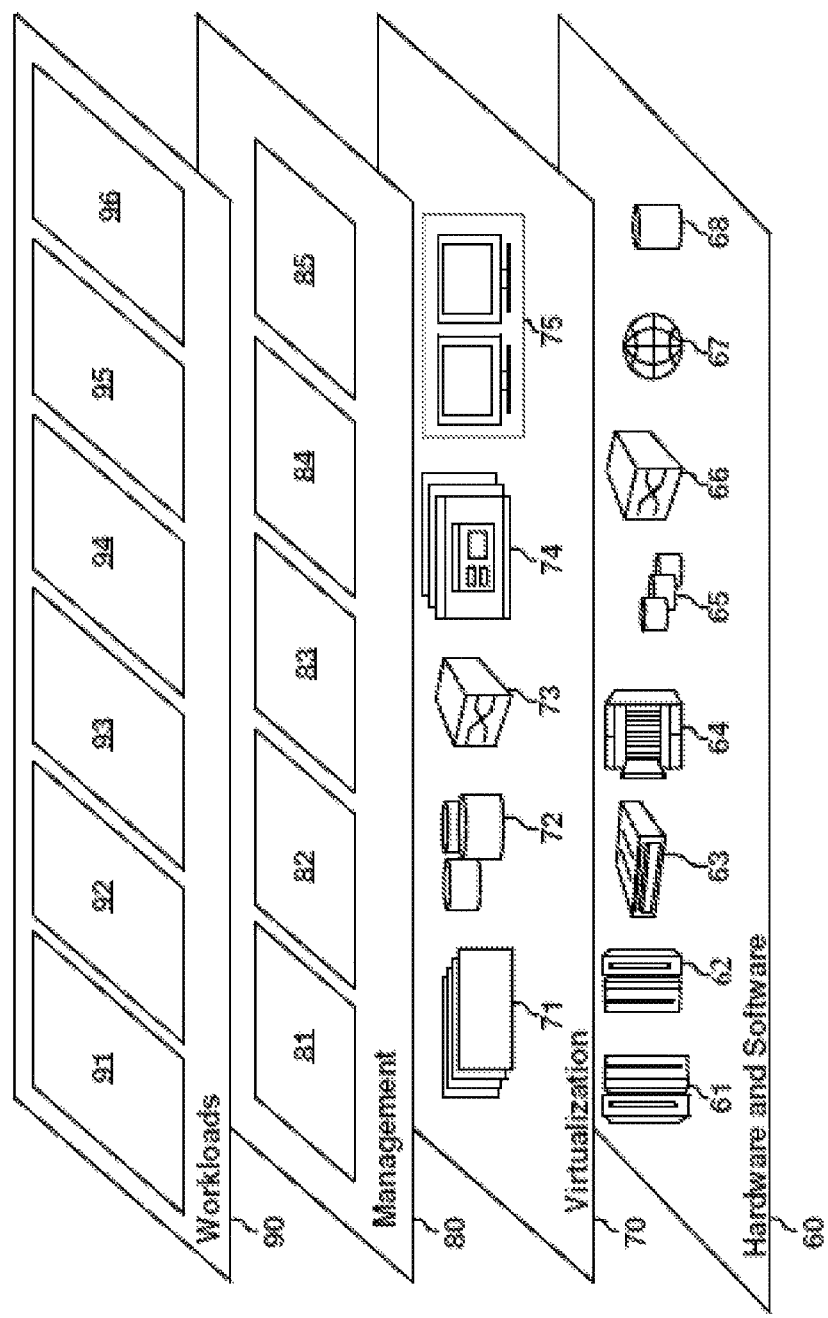
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and comparing skill gaps between individuals or groups 96.

Figure 3:
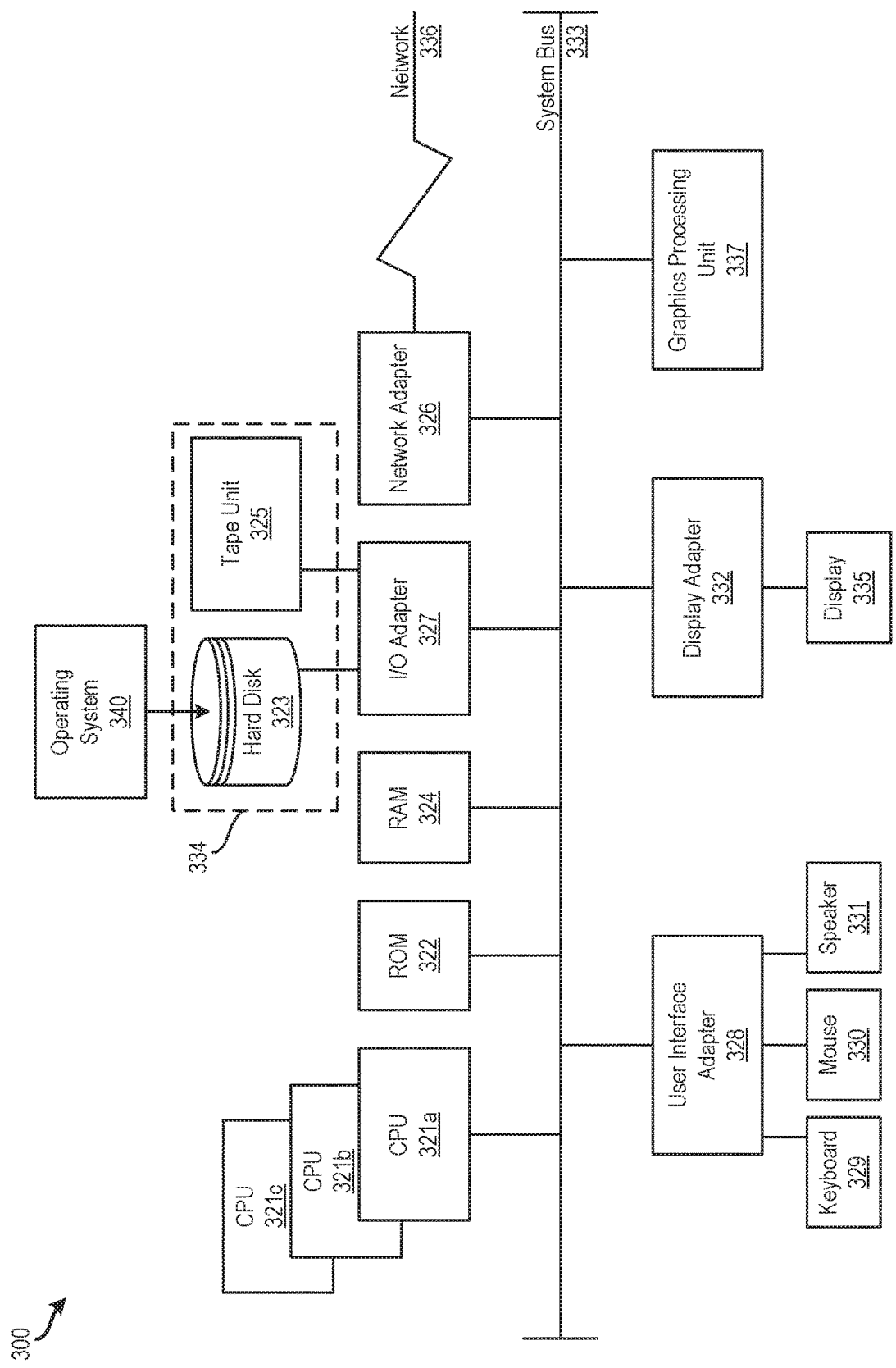
FIG. 3 depicts a block diagram of a processing system for implementing the techniques described herein according to aspects of the present disclosure.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a communications adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, a person in a particular role (such as a job) may desire to gain knowledge and/or skills to transition into a different role (referred to as a "target role") or to grow in his or her current role. The target role is a role or position that a user wishes to obtain. A target role can also refer to obtaining the skills and knowledge useful to perform a current role more efficiently and effectively. There are no existing efficient mechanisms to facilitate identifying and acquiring knowledge and skills for a different job position based on a peer-to-peer comparison of roles. Traditionally, if a person wants to understand and/or obtain knowledge that will enable the person to develop the skills required to transition into another role, the person must manually search for general job role education information. However, this general job role education information often lacks specific information useful for transitioning into the target role, such as the day-to-day knowledge and skills used to perform functions of the target role and/or to effectively build and maintain relationships associated with the target role (e.g., direct reports, managers, etc.).

Existing approaches fail to provide an efficient mechanism to identify and acquire knowledge and skills for a target role. For example, existing approaches do not provide a peer-to-peer comparison to identify knowledge and skills gaps, do not identify supplementary skill gaps for a future role, do not utilize unstructured profile data (e.g., social networking data, email data, chat history data, and the like) to create a tailored skill gap list, and more.

Turning now to an overview of the aspects of the invention, one or more embodiments of the invention address the above-described shortcomings of the prior art by providing an efficient mechanism to identify and acquire knowledge and skills for a target role by identifying a skill gap between two individuals. One or more embodiments of the present invention scan and identify individual or group of individuals' digital profile data (i.e., data collected about and pertaining to an individual or group of individuals' education, skills, etc.) and determine skills gaps to enhance a person's education for growth towards a target role. The present techniques receive unstructured information in the form of the digital profile data from two individuals (Person A and Person B (or group)) and perform a peer-to-peer comparison to compare the unstructured information to determine skills gaps for Person A relative to Person B (or group). A skills gap is a difference in skills between a first individual (e.g., Person A) and a second individual (e.g., Person B (or group)).

The above-described aspects of the invention address the shortcomings of the prior art in several ways. For example, the prior art fails to address peer-to-peer comparisons for identifying skill gaps. Further, the prior art does not address identifying supplementary skill gaps based on day-to-day activities for a target job role. Additionally, the prior art does not address dealing with unstructured data for individuals that can be used for performing peer-to-peer skill gap comparisons.

Figure 4:
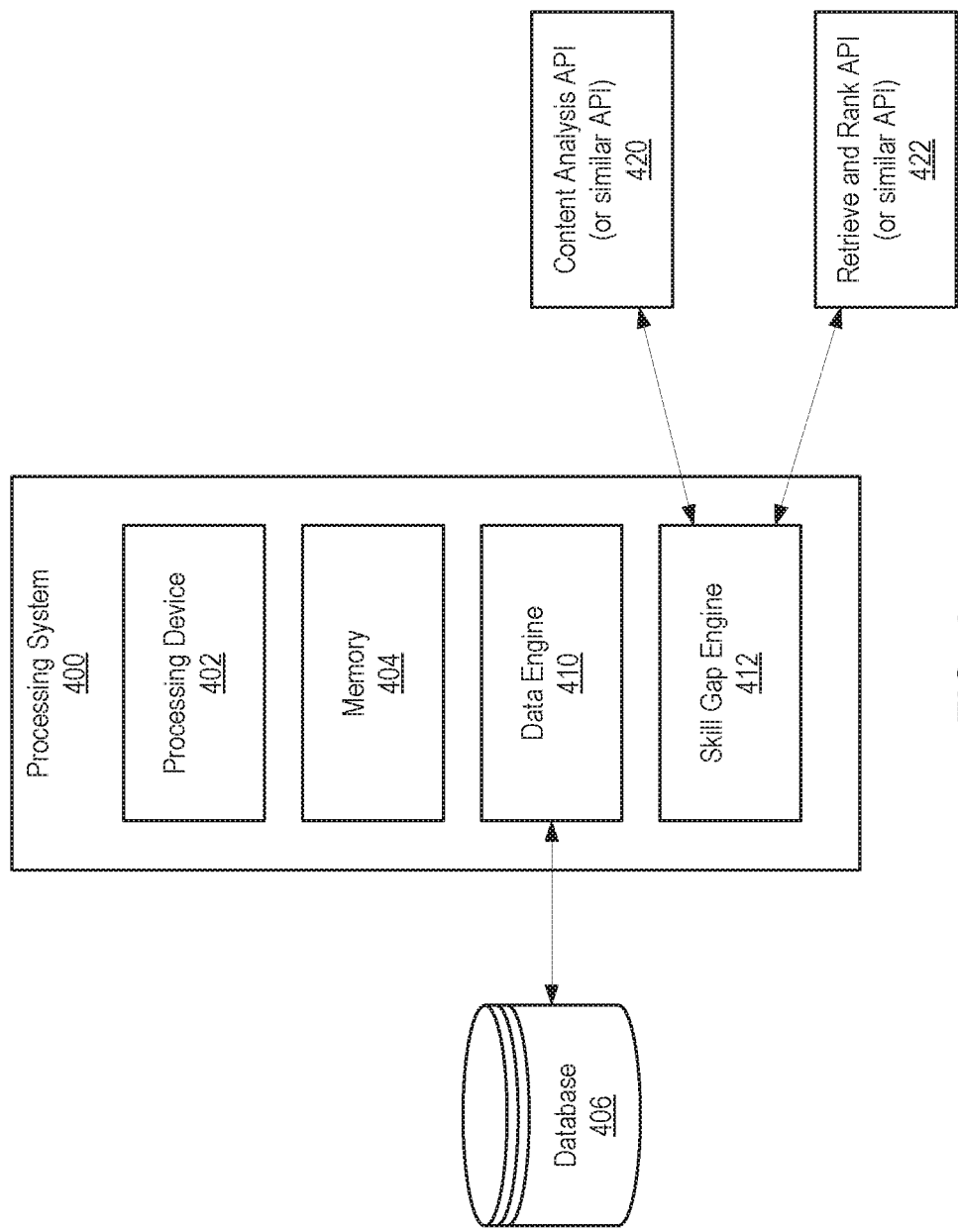
FIG. 4 depicts a block diagram of a processing system for performing a skill gap comparison according to one or more embodiments of the present invention.

Turning now to a more detailed description of aspects of the present invention, FIG. 4 depicts a block diagram of a processing system 400 for performing a skill gap comparison according to one or more embodiments of the present invention. The processing system 400 includes a processing device 402, a memory 404, a data engine 410 for receiving data from and/or transmitting data to a database 406, and a skill gap engine 412 for performing a skill gap comparison.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

The data engine 410 receives data from a database 406, which can represent one or more databases or other data stores for storing data. Data can be associated with different individuals. Thus, the data engine 410 can receive first data associated with a first individual, second data associated with a second individual, and so forth.

The data can include, but is not limited to, email data, chat history data, education data, calendar data, social network data, text message data, meeting transcript data, and other suitable data. The data may be structured (e.g., highly organized data), semi-structured (e.g., unstructured data that contains tags or information to define semantic elements and enforce hierarchies of records and fields within the data), and/or unstructured (e.g., unorganized data or data without a defined data model).

Once the data are received by the data engine 410, the skill gap engine 412 can begin the process of comparing data between individuals to determine a skill gap. The data engine 410 first enables the identification of preferences for performing the skill gap comparison. Next, the data engine 410 assigns a weight to elements of the first and second data. The elements can include words and/or phrases extracted from the data. These elements can be assigned a weight, for example, based on the identified preferences for performing the skill gap. The extraction can be performed using a content analysis API or another suitable platform for performing such an extraction. The weighting can be performed using a retrieve and rank API 422 or another suitable platform for performing such a weighting. The skill gap engine 412 can perform a skill gap comparison between the first individual and the second individual by comparing the first data and the second data using the identified preferences and weighting of elements.

Figure 5:
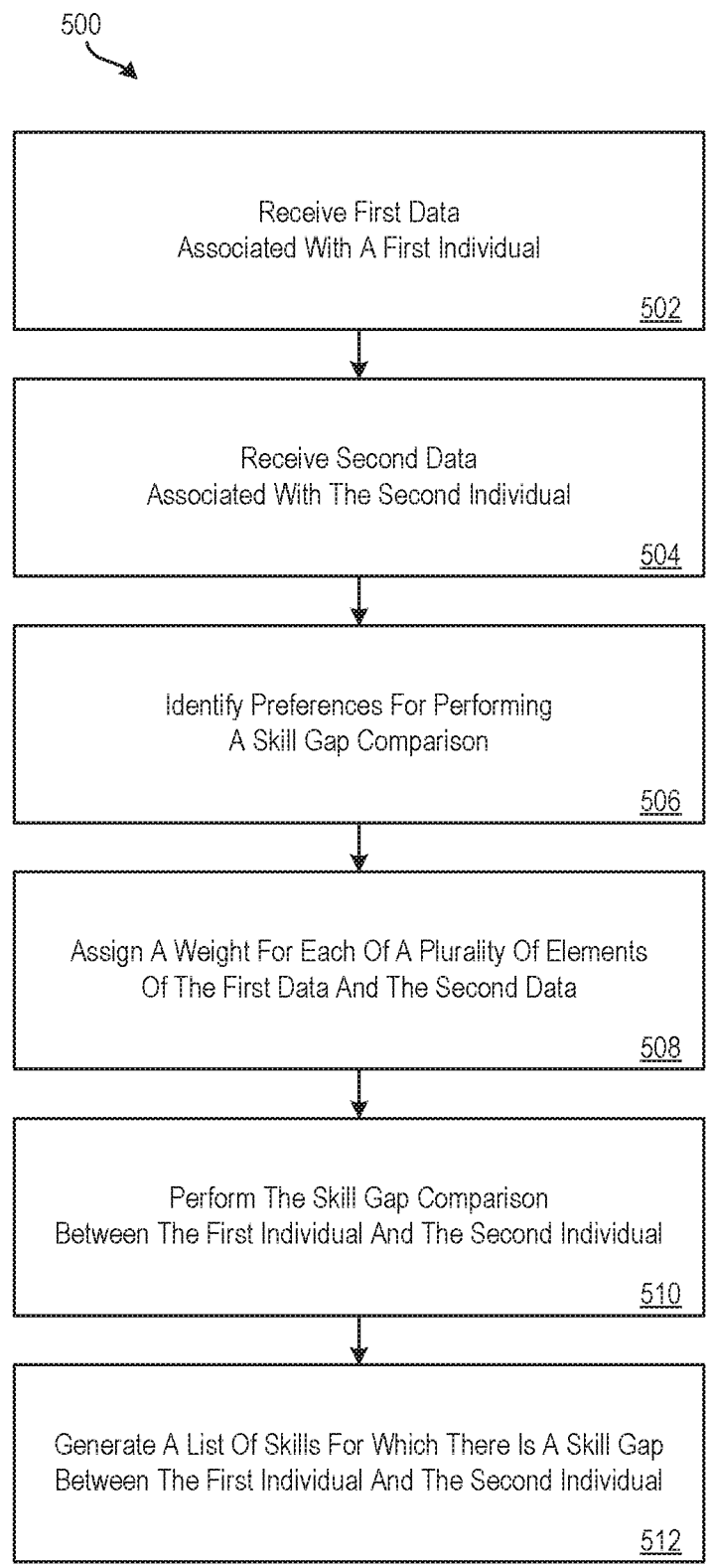
FIG. 5 depicts a flow diagram of a method for performing a skill gap comparison between a first individual and a second individual (or group) according to one or more embodiments of the present invention.

FIG. 5 depicts a flow diagram of a method 500 for performing a skill gap comparison between a first individual and a second individual (or group) according to one or more embodiments of the present invention. The method 500 can be performed using any suitable processing device (e.g., the CPU 321, the processing device 402) and/or processing system (e.g., the processing system 300, the processing system 400) or suitable combinations thereof.

At block 502, the data engine 410 receives first data associated with a first individual. At block 504, the data engine 410 receives second data associated with a second individual (or group). The first data associated with the first individual and/or the second data associated with the second individual (or group) can be structured data, semi-structured data, and/or unstructured data. Examples of unstructured data can include one or more of email data, chat history data, education transcript data, calendar data, social media data, role description data, resume data, and the like.

At block 506, the skill gap engine 412 identifies preferences for performing the skill gap comparison. Preferences enable the skill gap comparison to be limited to specific search fields, time periods, etc., and/or focused on particular topics such as formal education type. Examples of preferences can include a time period (e.g., a number of days) for which to search the first data and the second data, fields to be searched (e.g., subject of emails, body of chat history), types of data to be searched (e.g., email, chats, social networks, meeting transcripts, resumes, etc.), education type (including related articles, web links, informal education, formal education, etc.), a language, search results limit (e.g., 5 results, 10 results, 25 results, etc.), and others.

At block 508, the skill gap engine 412 assigns a weight for each of a plurality of elements of the first data and the second data. The plurality of elements of the first data and the second data can words and phrases associated with skills. Words and phrases can be detected that are indicative of skills. For example, the skill gap engine 412 can analyze words and phrases detected in the second individual's chat history data to determine soft skills that the second individual may use when performing functions of his role. Such soft skills can include particular topics the second individual discusses with his or her direct reports and/or with his or her supervisor. Assigning the weight at block 508 can be performed using a cognitive exploration and content analysis platform such as a content analysis API (e.g., content analysis API 420) or another suitable platform.

At block 510, the skill gap engine 412 performs the skill gap comparison between the first individual and the second individual (or group) to determine a skill gap. The skill gap comparison is performed by comparing the first data to the second data based at least in part on the preferences identified for performing the skill gap comparison at block 506 and/or the weight assigned for each of the plurality of elements of the first data and the second data at block 508.

Performing the skill gap comparison can include identifying skills for the first individual from the first data associated with the first individual. Performing the skill gap comparison can also include identifying skills for the from the second data associated with the second individual. By using the preferences and ranking to perform the skill gap comparison, processing resources are reduced and the search can be performed more expeditiously than in the prior art. For example, the search can be limited to certain time periods, certain subjects, etc., which reduces search time and increases efficiency. Similarly, by performing the skill gap comparison using the weight of the elements of the first and second data, higher weighted elements can be searched without spending processing resources and time to search for lower weight elements.

According to one or more embodiments of the present invention, the second individual (or group) can represent a group of individuals and the second data can represent data associated with the group of individuals. This enables the skill gap comparison at block 510 to be performed by comparing the first person to a group of individuals.

At block 512, the skill gap engine 412 generates a list of one or more skills for which there is a skill gap, as determined at block 510, between the first individual and the second individual.

Additional processes also may be included. For example, according to one or more embodiments of the present invention, the skill gap engine 412 can update the list of one or more skills in real-time when at least one of new first data associated with the first individual and new second data associated with the second individual (or group) are received. By updating the list of skills in real-time, the present techniques can account for changes in individual's skills. For example, if the second individual (or group) develops a new skill, it can be determined and can be added to the list of skills for which there is a skill gap. This enables the first individual to seek additional training or knowledge to develop the new skill.

As another example, according to one or more embodiments of the present invention, the skill gap engine 412 can generate a list of a plurality of skilled individuals. The skilled individuals each have at least one of the skills of the list of the one or more skills for which there is a skill gap between the first individual and the second individual. By identifying the skilled individuals that have one of the skill gap skills, the first individual (or the second individual) can perform skill gap comparisons with that skilled individual, can seek training or mentorship from that skilled individual, etc. The skill gap engine 412 can rank the plurality of skilled individuals based at least in part on a skill level of the at least one of the skills of the list of one or more skills. For example, a highly skilled individual (e.g., a skill level of 9 on a scale of 1-10) can be ranked higher than a less skilled individual (e.g., a skill level of 5 on a scale of 1-10). Performing the ranking can be performed using a retrieve and rank platform such as a retrieve and rank API (e.g., the retrieve and rank API 422) or another suitable platform.

It should be understood that the process depicted in FIG. 5 represents an illustration, and that other processes may be added or existing processes may be removed, modified, or rearranged without departing from the scope and spirit of the present disclosure.

Figure 6:
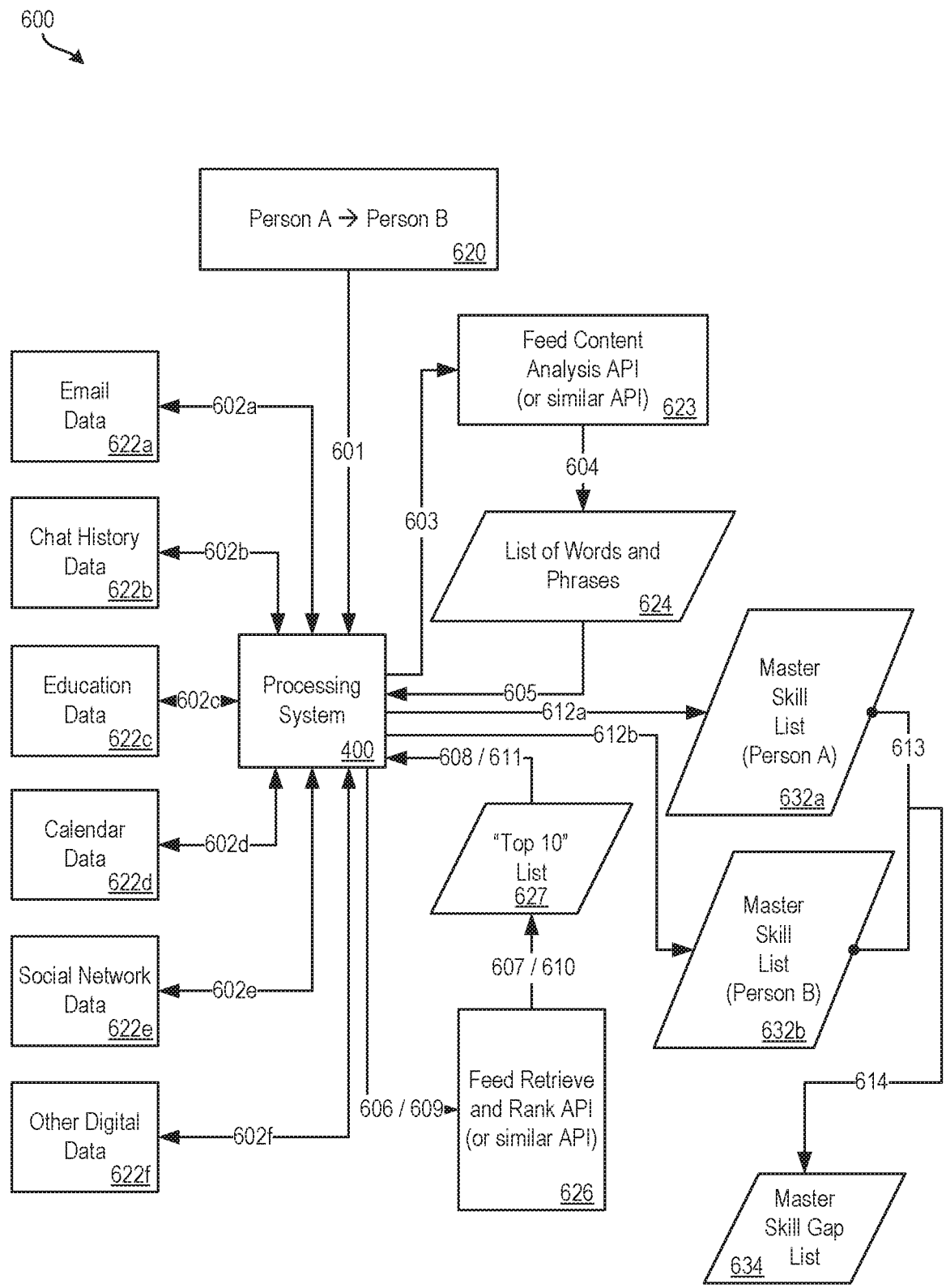
FIG. 6 depicts a flow diagram of a method for performing a skill gap comparison between a first individual and a second individual (or group) according to one or more embodiments of the present invention.

FIG. 6 depicts a flow diagram of a method 600 for performing a skill gap comparison between a first individual and a second individual (or group) according to one or more embodiments of the present invention. The method 500 can be performed using any suitable processing device (e.g., the CPU 321, the processing device 402) and/or processing system (e.g., the processing system 300, the processing system 400) or suitable combinations thereof. The method 600 is now described with reference to blocks 620, 622a, 622b, 622c, 622d, 622e, 622f, 623, 624, 626, 627, 632a, 632b, 634, and steps 601, 602a, 602b, 602c, 602d, 602e, 602f, 603, 604, 605, 606, 607, 608, 609, 610, 611, 612a, 612b, 613, 614.

The method 600 begins at block 620, where a skill gap comparison between Person A and Person B (or group) is initiated. That is, a comparison of Person A to Person B (or group) is desired such that a skill gap between Person A and Person B (or group) is determined. This is useful, for example, when Person A wants to determine what skills he or she needs to acquire to perform a target role performed by Person B. At step 601, the method 600 proceeds initiate the skill gap comparison process on the processing system 400.

The processing system 400 obtains or receives data from various data sources for each of the individuals (e.g., Person A and Person B (or group)) to generate a digital profile for each of the individuals. For example, at step 602a, the processing system 400 receives data from an email data source 622a. Similarly, at step 602b, the processing system 400 receives data from a chat history data source 622b. At step 602c, the processing system 400 receives data from an education data source 622c. At step 602d, the processing system 400 receives data from a calendar data source 622d. At step 602e, the processing system 400 receives data from a social network data source 622e. At step 602c, the processing system 400 receives data from other digital data sources 622f.

Once the data is received from the various sources 622a-622f, the processing system 400 initiates step 603, which feeds the data into the content analysis API 623 or another suitable API. The content analysis API 623 or another suitable API extracts elements, such as words and/or phrases, from the data received in steps 602a-602f. Using the extracted elements, a list of words and phrases 624 is created at step 604 and is sent back to the processing system 400 at step 605. It should be appreciated that the elements can be extracted for one or both of the individuals (e.g., Person A, Person B (or group)).

At step 606, the elements (i.e., the list of words and phrases 624) are fed into the retrieve and rank API 626 or another suitable API. The retrieve and rank API 626 or another suitable API assigns weights for each of the elements of the first data and the second data. In some examples, the retrieve and rank API 626 generates, at step 607, a "top 10" list 627 (or other ranking, such as a "top 5" list or a "highest priority" list) of the elements, which are fed back into the processing system 400 at step 608. According to one or more embodiments of the present invention, the steps 606, 607, 608 can be repeated/iterated (labeled steps 609, 610, 611 respectively) to update the list 627 based on changes to the data 622a-622f. This provides for real-time (or near real-time) updates to the list 627. By using the list 627, which may include less than all of the elements from the list of words and phrases 624, performing updates to the list 627 improves the functioning of the processing system 400 by reducing the amount of processing, memory, storage, and/or power resources that the processing system 400 utilizes. For example, by only updating the "top 10" elements from the list 627, the processing system 400 need not waste resources updating non-top 10 elements. It should be appreciated that the list 627 can be generated for one or both of the individuals (e.g., Person A, Person B (or group)).

The processing system 400 then performs a skill gap comparison between Person A and Person B. At step 612a, a master skill list 632a for Person A is generated. The master skill list 632a represents a list of top skills that Person A possesses. Similarly, at step 612b, a master skill list 632b for Person B is generated. The master skill list 632b represents a list of top skills that Person B possesses. At step 613, the processing system 400 compares the lists 632a, 632b to generate, at step 614, a master skill gap list 634 that represents a list of skills for which there is a skill gap between Person A and Person B. The master skill gap list 634 includes skills (or knowledge) that Person B possesses that Person A does not possess. Person A, therefore, may wish to acquire or develop the skills included in the master skill gap list 634 if Person A desires to be more like Person B (e.g., to obtain a job similar to that of Person B).

Additional processes also may be included, and it should be understood that the process depicted in FIG. 6 represents an illustration and that other processes may be added or existing processes may be removed, modified, or rearranged without departing from the scope and spirit of the present disclosure.

The present techniques can be implemented in a variety of different use cases. As one example, an individual would like to take on the role of a specific person and take over their job duties (e.g., the user is seeking a promotion into another role). In another example, an individual would like to gain skills and knowledge for a specific role (e.g., system programmer, accountant, sales manager, etc.). In yet another example, an individual such as a supervisor or manager would like to determine missing skills from within their team or department so that additional team members can be hired to fill the skills gap, that additional training of existing team members can be performed, etc. As another example, an individual would like to prepare for a client visit and needs to understand the client's cultural needs, discussion topics, required skills, and the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing a skill gap comparison between a first individual and a second individual, the method comprising:
    receiving, by a processing device, first data associated with the first individual;
    receiving, by the processing device, second data associated with the second individual;
    identifying, by the processing device, preferences for performing the skill gap comparison;
    assigning, by the processing device, a weight for each of a plurality of elements of the first data and the second data;
    generating, by the processing device, a ranked list of a subset of the plurality of elements; iteratively updating, by the processing device, the ranked list responsive to a change to one or more of the first data and the second data that relates to the subset of the plurality of elements without updating the ranked list responsive to a change to one or more of the first data and the second data that does not relate to the subset of the plurality of elements;
    performing, by the processing device, the skill gap comparison between the first individual and the second individual by comparing the first data to the second data based at least in part on the preferences identified for performing the skill gap comparison and the weight assigned for each of the plurality of elements of the first data and the second data, wherein performing the skill gap comparison is based at least in part on the ranked list;
    generating, by the processing device, a list of one or more skills for which there is a skill gap between the first individual and the second individual;
    generating, by the processing device, a list of a plurality of skilled individuals, each of the plurality of skilled individuals having at least one of the skills of the list of the one or more skills for which there is a skill gap between the first individual and the second individual; and ranking, by the processing device, the plurality of skilled individuals based at least in part on a skill level of the at least one of the skills of the list of one or more skills.

2. The computer-implemented method of claim 1, further comprising: updating, by the processing device, the list of one or more skills in real-time when at least one of new first data associated with the first individual and new second data associated with the second individual are received.

3. The computer-implemented method of claim 1, wherein the first data associated with the first individual is first unstructured data, and wherein the second data associated with the second individual is second unstructured data.

4. The computer-implemented method of claim 3, wherein the first unstructured data associated with the first individual comprise one or more of email data, chat history data, education transcript data, calendar data, social media data, role description data, and resume data.

5. The computer-implemented method of claim 3, wherein the second unstructured data associated with the second individual comprise one or more of email data, chat history data, education transcript data, calendar data, social media data, role description data, and resume data.

6. The computer-implemented method of claim 1, wherein the plurality of elements of the first data and the second data comprise words and phrases associated with skills.

7. The computer-implemented method of claim 1, wherein assigning the weight for each of the plurality of elements of the first data and the second data comprises determining the plurality of elements using a cognitive exploration and content analysis platform.

8. The computer-implemented method of claim 1, wherein performing the skill gap comparison comprises identifying skills for the first individual from the first data associated with the first individual and identifying skills for the second individual from the second data associated with the second individual.

9. The computer-implemented method of claim 1, wherein the ranking is performed using a retrieve and rank platform.

10. The computer-implemented method of claim 1, wherein the second individual represents a plurality of individuals, and wherein the second data associated with the second individual represents data associated with the plurality of individuals.

11. A system comprising:
a memory comprising computer readable instructions; and
a processing device for executing the computer readable instructions for performing a method for performing a skill gap comparison between a first individual and a second individual, the method comprising:
receiving, by the processing device, first data associated with the first individual;
receiving, by the processing device, second data associated with the second individual;
identifying, by the processing device, preferences for performing the skill gap comparison;
assigning, by the processing device, a weight for each of a plurality of elements of the first data and the second data;
generating, by the processing device, a ranked list of a subset of the plurality of elements;
iteratively updating, by the processing device, the ranked list responsive to a change to one or more of the first data and the second data that relates to the subset of the plurality of elements without updating the ranked list responsive to a change to one or more of the first data and the second data that does not relate to the subset of the plurality of elements;
performing, by the processing device, the skill gap comparison between the first individual and the second individual by comparing the first data to the second data based at least in part on the preferences identified for performing the skill gap comparison and the weight assigned for each of the plurality of elements of the first data and the second data, wherein performing the skill gap comparison is based at least in part on the ranked list;
generating, by the processing device, a list of one or more skills for which there is a skill gap between the first individual and the second individual;

generating, by the processing device, a list of a plurality of skilled individuals, each of the plurality of skilled individuals having at least one of the skills of the list of the one or more skills for which there is a skill gap between the first individual and the second individual; and
ranking, by the processing device, the plurality of skilled individuals based at least in part on a skill level of the at least one of the skills of the list of one or more skills.

12. The system of claim 11, wherein the method further comprises: updating, by the processing device, the list of one or more skills in real-time when at least one of new first data associated with the first individual and new second data associated with the second individual are received.

13. The system of claim 11, wherein the first data associated with the first individual is first unstructured data, and wherein the second data associated with the second individual is second unstructured data.

14. The system of claim 13, wherein the first unstructured data associated with the first individual comprise one or more of email data, chat history data, education transcript data, calendar data, social media data, role description data, and resume data.

15. The system of claim 13, wherein the second unstructured data associated with the second individual comprise one or more of email data, chat history data, education transcript data, calendar data, social media data, role description data, and resume data.

16. The system of claim 11, wherein the plurality of elements of the first data and the second data comprise words and phrases associated with skills.

17. The system of claim 11, wherein assigning the weight for each of the plurality of elements of the first data and the second data comprises determining the plurality of elements using a cognitive exploration and content analysis platform.

18. The system of claim 11, wherein performing the skill gap comparison comprises identifying skills for the first individual from the first data associated with the first individual and identifying skills for the second individual from the second data associated with the second individual.

19. A computer program product comprising:
a computer readable storage medium having program instructions embodied therewith, the program instructions executable by a processing device to cause the processing device to perform a method for performing a skill gap comparison between a first individual and a second individual, the method comprising:
receiving, by the processing device, first data associated with the first individual;
receiving, by the processing device, second data associated with the second individual;
identifying, by the processing device, preferences for performing the skill gap comparison;
assigning, by the processing device, a weight for each of a plurality of elements of the first data and the second data;
generating, by the processing device, a ranked list of a subset of the plurality of elements;
iteratively updating, by the processing device, the ranked list responsive to a change to one or more of the first data and the second data that relates to the subset of the plurality of elements without updating the ranked list responsive to a change to one or more of the first data and the second data that does not relate to the subset of the plurality of elements;

performing, by the processing device, the skill gap comparison between the first individual and the second individual by comparing the first data to the second data based at least in part on the preferences identified for performing the skill gap comparison and the weight assigned for each of the plurality of elements of the first data and the second data, wherein performing the skill gap comparison is based at least in part on the ranked list; and generating, by the processing device, a list of one or more skills for which there is a skill gap between the first individual and the second individual;

generating, by the processing device, a list of a plurality of skilled individuals, each of the plurality of skilled individuals having at least one of the skills of the list of the one or more skills for which there is a skill gap between the first individual and the second individual; and ranking, by the processing device, the plurality of skilled individuals based at least in part on a skill level of the at least one of the skills of the list of one or more skills.

\* \* \* \* \*